United States Patent [19]
Donnelly

[11] 3,778,859
[45] Dec. 18, 1973

[54] PIPELINE SQUEEGEE APPARATUS

[75] Inventor: Frank R. Donnelly, Rockaway, N.J.

[73] Assignee: Spin Company, Newfoundland, N.J.

[22] Filed: Oct. 2, 1972

[21] Appl. No.: 294,013

[52] U.S. Cl.... 15/104.3 R, 15/104.06 R, 15/104.16
[51] Int. Cl............................................. B08b 9/02
[58] Field of Search................... 15/104.05, 104.16, 15/104.3 R, 104.06 R, 104.06 A

[56] References Cited
UNITED STATES PATENTS
1,117,192  11/1914  Kelly............................ 15/114.3 R
1,732,277  10/1929  Owens....................... 15/104.3 R X Primary Examiner—Edward L. Roberts
Attorney—Marvin A. Naigur

[57] ABSTRACT

A pipeline squeegee is provided for removing excess water and debris from the interior of a pipeline. The squeegee apparatus is in the form of a plurality of dual cone units which traverse the interior of the pipeline.

9 Claims, 3 Drawing Figures

PATENTED DEC 18 1973　　　　　　　　　　　　　3,778,859
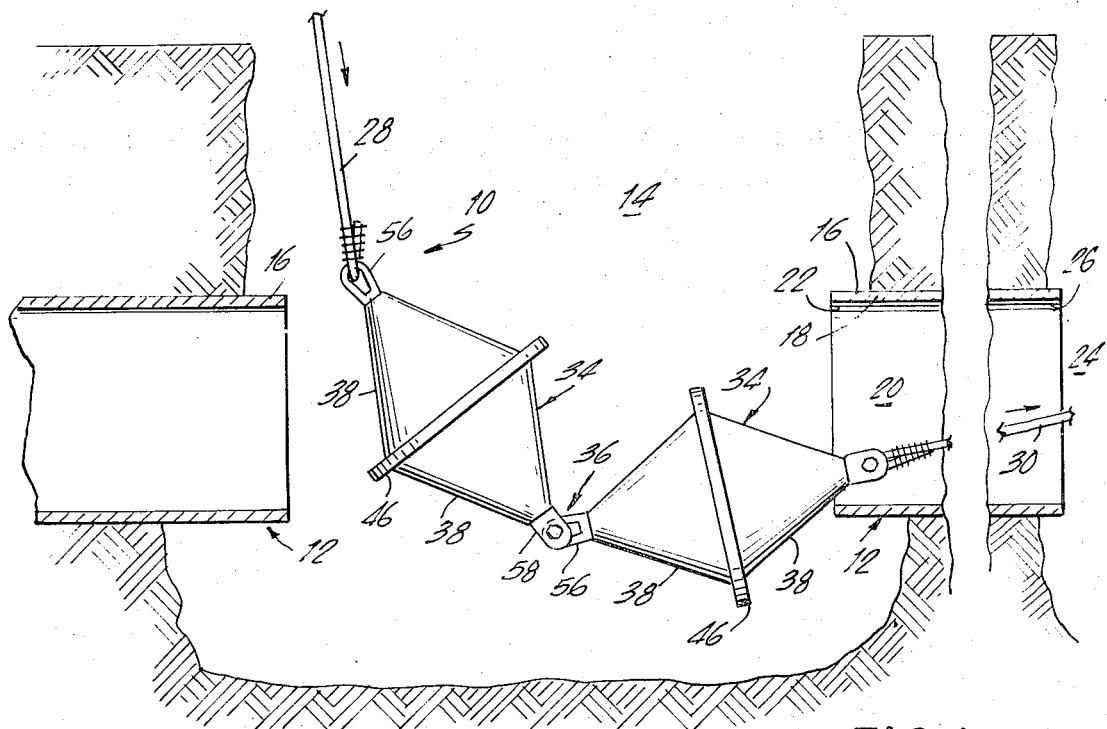
FIG.1
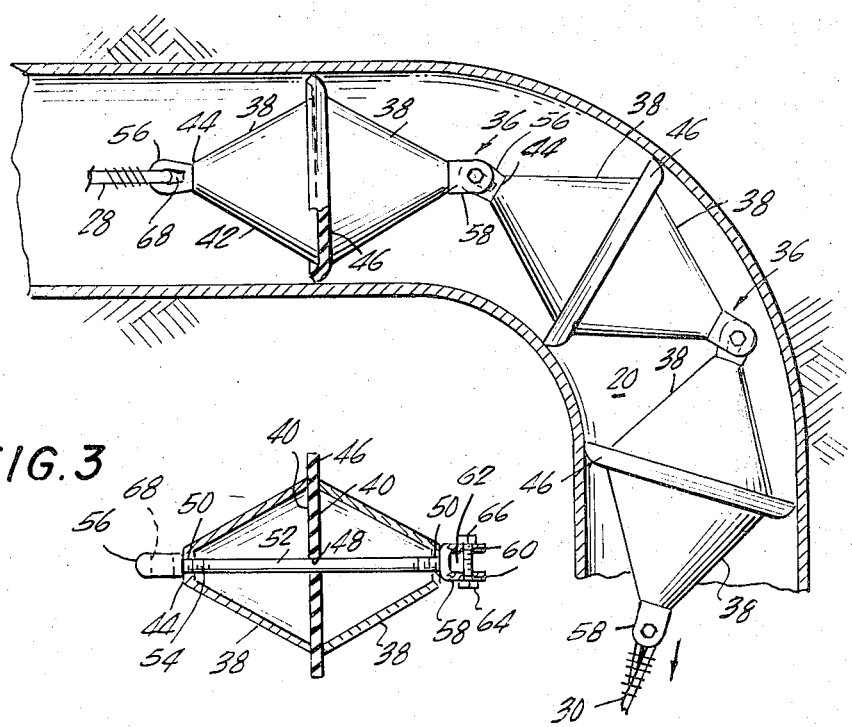
FIG.2
FIG.3

PIPELINE SQUEEGEE APPARATUS

BACKGROUND OF THE INVENTION

In the construction of new subterranean pipelines and the cleaning of existing pipelines, a coating of mortar cement is usually applied to the interior surface. Prior to the application of the mortar it is necessary to remove any water and debris from the pipeline, since a clean, dry inner surface must be prepared prior to the lining of the pipeline with mortar. Since the pipelines are located anywhere from four to forty feet below the surface, the operations are usually accomplished through the use of remotely operated equipment. Access to the pipeline is usually gained through excavations and openings which are located at the beginning and end of the stretch of pipeline under construction. It is common practice to pull the pipelining equipment through the pipeline by means of a winch driven cable. In the operation of this equipment, particularly during the squeegee operation, difficulty has been encountered in feeding the squeegee devices into the pipeline entrance opening. Also, once the squeegee devices had been implanted in the pipeline it became difficult to negotiate bends or curves in the pipeline, as well as to remove the squeegee through the pipeline exit. These problems were due to the fact that prior squeegee units generally consisted of a rigid steel bar on which a series of rubber discs had been mounted. Thus, it was often necessary to have personnel at the pipeline opening to properly insert and remove the rigid bar squeegee. This practice resulted in injuries and fatalities due to the great depth of the pipeline below the surface and the use of a winch drive that was at the pipeline exit which was located at a relatively great distance from the entrance. Also, when the rigid bar squeegee became stuck or broken due to a curve in the pipeline, it often was necessary to send personnel into the pipeline to clear the squeegee. Accordingly, the use of rigid bar squeegee apparatus has resulted in undue injuries, delays, and expense. In order to overcome these difficulties in accordance with the present invention, there has been provided a self-aligning squeegee in the form of at least two double cone squeegee units which are flexibly coupled together. Accordingly, these features allow the self-aligning squeegee to remotely be fed into the pipeline without the need for operating personnel at the entrance and exit of the pipeline, and once operating in the pipeline it is possible to negotiate curved sections without the squeegee breaking or becoming stuck.

SUMMARY OF THE INVENTION

In accordance with an illustrative embodiment demonstrating features and advantages of the present invention there is provided an apparatus capable of moving axially through the interior of a subterranean pipeline, formed with a surface opening. The apparatus comprises at least two squeegee units and flexible coupling means connected between the squeegee units. Each of the squeegee units is formed from a pair of cones and a flexible disc joined along the base sections of the cones. Thus, the squeegee units can be positioned remotely into the pipeline through the opening for traversing the inner pipeline surface without becoming misaligned, such that excess water and debris are removed from the interior of the pipeline.

BRIEF DESCRIPTION OF THE DRAWINGS

The above brief description, as well as further objects, features, and advantages of the present invention will be more fully appreciated by reference to the following detailed description of a presently preferred but nonetheless illustrative embodiment in accordance with the present invention when taken in connection with the accompanying drawings wherein:

FIG. 1 is a longitudinal sectional view of the pipeline squeegee apparatus of the present invention shown being introduced into a pipeline through an excavation and entrance opening in the pipeline;

FIG. 2 is a longitudinal sectional view of the pipeline squeegee of FIG. 2 shown traversing a curved pipeline; and FIG. 3 is a sectional view of a detached squeegee unit that is shown to illustrate the manner in which the squeegee unit is assembled.

DESCRIPTION OF THE PREFERRED EMBODIMENT

With reference to FIG. 1, there is shown a pipeline squeegee apparatus generally designated by the reference numeral 10, that is being inserted into a subterranean pipeline 12. The squeegee apparatus 10 is being passed into an entrance excavation 14 where the pipeline 12 has been separated to form two pipeline sections 16. Each of the pipeline sections 16 is formed with a cylindrical wall 18 which defines an internal chamber 20 having an entrance opening 22. An exit excavation 24 is also partially shown in FIG. 1, in which there is located the end section of cylindrical wall 18 which is formed with an exit opening 26. The pipeline squeegee apparatus 10 is lowered into the entrance of excavation 14 by means of a guide line 28 and drawn through the pipeline 12 by means of a tow line 30. It should be understood that the squeegee apparatus 10 is usually drawn through pipeline 12 by means of a winch, located on the surface above exit excavation 24, which is connected to the tow line 30. It also is possible to tow the squeegee apparatus by means of a self-propelled pipelining machine. As the winch and self-propelled pipelining machines are well known in the art, this equipment has not been shown in the drawings for the sake of simplicity.

The squeegee apparatus 10 is moved axially through the pipeline section 16 prior to the application of a fresh coating of mortar, such that water and debris are cleared out of the internal chamber 20.

In accordance with the present invention, the squeegee apparatus 10 comprises at least two squeegee units 34, joined together by flexible coupling means 36. The squeegee unit 34 is formed from a pair of cones 38 each of which are defined by a base section 40 and conical wall 42 which extends from base section 40 to an end tip 44. Each pair of the cones 38 is joined together by placing the base sections 40 in a spaced apart coextensive position. In this manner it is possible to insert a flexible disc 46, formed with a central opening 48, between adjacent base sections 40 prior to securing cones 38 together. It is preferable to fabricate the disc 46 from rubber material and the cones 38 from steel.

As best shown in FIG. 3, the cones 38 are formed with openings 50 which are located in the end tips 44, such that alignment can be achieved with central opening 48 when disc 46 is positioned between the cones 38.

In this manner, a rod 52, with opposing external threaded ends 54, is inserted through the opening 50 in one of the cones 38, the central opening 48, and the opening 50 in the other cone 38. The squeegee unit 34 shown in FIG. 1 is fastened together by an internally threaded eye nut 56 and U-shaped nut 58. Thus, by threadably engaging the nuts 56 and 58 with the threaded ends 54, the base sections 40 of the opposing cones 38 are compressed against disc 46. The U-shaped nut 58 is formed with aligned through bores 60 which are located on opposite sides of an opening 62, and the through bores 60 are sized to receive a locking bolt 64 that is secured by a locking nut 66. The eye nut 56 has a generally annular configuration and is formed with a center opening 68.

The flexible coupling means 36 is formed by linking eye nut 56 and U-shaped nut 58. This connection is achieved by positioning the opening 62 of U-shaped nut 58 over eye nut 56 such that the opposing through bores 60 are in alignment with center opening 68. The locking bolt 64 can then be inserted in through bores 60 and in central opening 60, with the locking nut 66 threadably engaging locking bolt 64 to complete the flexible coupling 36. Any number of coupling means equivalent to the nuts 56 and 58 can be used to form the flexible coupling 36. An example of such an equivalent coupling which is not shown in the drawings, is the provision of a relatively heavy bendable length of wire cable which can be welded to adjacent end tips 44.

By progressively inspecting FIGS. 2 and 3, it can be appreciated that the discs 46 are sized with a diameter that is somewhat larger than the internal diameter of cylindrical wall 18. This enables the outer ends of the discs 46 to become tightly engaged with the inner surface of cylindrical wall 18, such that these outer ends are bent outward in a direction opposite to the movement of squeegee units 34. Accordingly, the squeegee units 34 traverse the internal chamber 20 to remove water and debris from the pipeline 16.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. Apparatus capable of moving axially through the interior of a subterranean pipeline having a surface opening comprising at least two squeegee units, flexible coupling means connected between said squeegee units, and each of said squeegee units formed from a pair of cones and a flexible disc joined along the base sections of said cones, whereby said squeegee units can be positioned remotely into said pipeline through said opening for traversing said inner pipeline surface without becoming misaligned, such that excess water and debris are removed from the interior of said pipeline.

2. Apparatus according to claim 1 in which said coupling means comprises a pair of rings which are loosely interconnected together, and each ring is secured to the adjacent end tips.

3. Apparatus according to claim 1 in which said coupling means comprises a length of wire capable of bending that is secured to adjacent end tips.

4. Apparatus according to claim 1 in which said coupling means comprises a closed eye loop formed with a center opening mounted on one of said end tips of one of said cones, an open loop formed with a U-shaped opening mounted on one of said end tips of another of said cones, said open loop formed with a pair of aligned bores, a locking bolt capable of being received in said aligned bores, such that said U-shaped opening can be positioned over said eye loop with said locking bolt passing through said aligned bores and said center opening, whereby said eye loop and said open loop are loosely interconnected together.

5. Apparatus according to claim 1, in which said cones are defined by a base section and conical wall which extends from said base section to an end tip, and each pair of said base sections are joined together in a spaced apart coextensive position, such that said disc can be mounted between adjacent base sections.

6. Apparatus according to claim 5, in which said coupling means comprises a pair of rings which are loosely interconnected together, and each ring is secured to the adjacent end tips.

7. Apparatus according to claim 5, in which said coupling means comprises a length of wire capable of bending that is secured to adjacent end tips.

8. Apparatus according to claim 5, in which the end tips of said cones and said disc are formed with aligned through openings for receiving a rod having externally threaded ends, and a pair of internally threaded nuts integrally formed on said coupling means for threadably engaging the ends of said rod such that said pair of cones is secured together and compressed against said flexible disc.

9. Apparatus according to claim 5, in which said coupling means comprises a closed eye loop formed with a center opening mounted on one of said end tips of one of said cones, an open loop formed with a U-shaped opening mounted on one of said end tips of another of said cones, said open loop formed with a pair of aligned bores, a locking bolt capable of being receiving in said aligned bores, such that said U-shaped opening can be positioned over said eye loop with said locking bolt passing through said aligned bores and said center opening, whereby said eye loop and said open loop are loosely interconnected together.

* * * * *